(12) United States Patent
Ghosh et al.

(10) Patent No.: US 8,780,828 B2
(45) Date of Patent: Jul. 15, 2014

(54) COGNITIVE RADIO DEVICE AND METHOD FOR DETERMINING CHANNEL OCCUPANCY

(75) Inventors: Monisha Ghosh, Chappaqua, NY (US); Vasanth Gaddam, Tarrytonw, NY (US); Kiran Challapali, New City, NY (US)

(73) Assignee: Koninklijke Philips N.V., Eindhoven (NL)

( * ) Notice: Subject to any disclaimer, the term of this patent is extended or adjusted under 35 U.S.C. 154(b) by 346 days.

(21) Appl. No.: 13/119,309

(22) PCT Filed: Sep. 3, 2009

(86) PCT No.: PCT/IB2009/053851
§ 371 (c)(1),
(2), (4) Date: Mar. 16, 2011

(87) PCT Pub. No.: WO2010/035159
PCT Pub. Date: Apr. 1, 2010

(65) Prior Publication Data
US 2011/0170512 A1    Jul. 14, 2011

Related U.S. Application Data

(60) Provisional application No. 61/100,844, filed on Sep. 29, 2008.

(51) Int. Cl.
*H04W 4/00* (2009.01)
*H04W 72/04* (2009.01)
*H04W 88/08* (2009.01)
*H04W 76/00* (2009.01)

(52) U.S. Cl.
CPC .............. *H04W 72/04* (2013.01); *H04W 88/08* (2013.01); *H04W 76/00* (2013.01)
USPC .......................................... 370/329; 370/328

(58) Field of Classification Search
CPC ...... H04W 72/04; H04W 88/08; H04W 76/00
USPC .......................................... 370/329, 328, 330
See application file for complete search history.

(56) References Cited

U.S. PATENT DOCUMENTS

| | | | |
|---|---|---|---|
| 8,027,690 B2 * | 9/2011 | Shellhammer | 455/454 |
| 8,032,086 B2 * | 10/2011 | Waltho et al. | 455/63.1 |
| 2006/0067354 A1 * | 3/2006 | Waltho et al. | 370/433 |
| 2008/0165680 A1 | 7/2008 | Chang | |
| 2009/0088176 A1 * | 4/2009 | Teo et al. | 455/452.1 |
| 2009/0186646 A1 * | 7/2009 | Ahn et al. | 455/509 |
| 2009/0323835 A1 * | 12/2009 | Rao et al. | 375/260 |

(Continued)

FOREIGN PATENT DOCUMENTS

EP    0897233 A2    2/1999

*Primary Examiner* — Chuong T Ho
(74) *Attorney, Agent, or Firm* — Larry Liberchuk

(57) ABSTRACT

A detector module (100) is operable in a cognitive radio device and capable of determining channel occupancy. The detector module comprises a sensor (110) for sensing incumbent signals at a variable sensing threshold, wherein the sensor generates a first occupancy indication indicating whether the channel includes an incumbent signal having a sensing metric above the variable sensing threshold; a geo-location unit (120) for generating a second occupancy indication based on a location of the detector module; and a decision unit (130) for generating an occupancy decision based on both the first occupancy indication and the second occupancy indication.

15 Claims, 2 Drawing Sheets

(56) References Cited

U.S. PATENT DOCUMENTS

2010/0035557 A1* 2/2010 Shellhammer ............ 455/67.11
2010/0069013 A1* 3/2010 Chaudhri et al. .......... 455/67.11
2010/0075704 A1* 3/2010 McHenry et al. ............ 455/509

* cited by examiner

COGNITIVE RADIO DEVICE AND METHOD FOR DETERMINING CHANNEL OCCUPANCY

This application claims the benefit of U.S. Provisional Application No. 61/100,844 filed on Sep. 29, 2009.

The invention generally relates to wireless communication devices and, more particularly, to cognitive devices and sharing of TV White space frequencies.

Cognitive devices, also known as white space devices, are being developed in order to use white space frequencies, available due to the termination of analog TV and a limited number of TV bands being used in a certain geographical location, to provide wireless broadband Internet access. However, transmission on such frequencies may impact incumbent services, such as TV stations and other wireless users.

A cognitive radio of a cognitive device (e.g., a television white space device) uses one of two different alternative techniques to determine if a channel is occupied by an incumbent TV signal. The first technique is based on sensing the channel to determine if the signal is present at or above a predefined level. The second technique includes a geo-location means and a database where the exact location of the cognitive device is used as an input to a database which then informs the device if the channel is occupied or not.

In order to avoid a hidden-node effect (i.e., a node is out of range of other nodes), the signal needs to be sensed at very low levels, e.g., −114 dBm for an advanced television systems committee (ATSC) signal which is 30 dB below the level needed for a viewable picture. Sensing at such low levels can lead to an increase in a false alarm rate. Also, temporal and spatial fading can cause sensing to miss detection of a real signal. On the other hand, the sensing technique is not based on geo-location information (which may be incomplete), thereby allowing a device to be un-tethered and truly cognitive. That is, there is no need to access a database before deciding on channel occupancy. In addition, the sensing technique enables the detection of signals that are not included or covered in geo-location databases.

The geo-location technique is usually based on predictions of signal coverage based on transmitted power, antenna type and height, and theoretical transmission models. Since terrain information is not taken into account, coverage contours can be quite inaccurate. Moreover, the device would need a geo-location means (e.g., GPS) and a database, which may be internal or external to the device. An access to the database is facilitated using a communication interface which may be either wired or wireless. The GPS, database and the communication interface add cost and complexity to the cognitive radio device. In addition, detection using this technique may be inaccurate at times due to either errors in the database or errors in determining location information. The advantage of the geo-location technique is that the occupancy decision is based on information that is independent of channel characteristics, and thus can greatly reduce the false alarm rate within the contour of a TV station, i.e., the coverage of a TV station.

As can be understood from the above discussion, separately applying the sensing or geo-location technique does not provide a reliable solution for detecting channel occupancy. Therefore, it would be an advantageous to provide a solution that would cure the deficiencies of the techniques discussed above.

Certain embodiments of the invention include a method for determining channel occupancy by a cognitive radio device. The method comprises sensing incumbent signals at a variable sensing threshold, wherein the sensor generates a first occupancy indication indicating that the channel includes an incumbent signal having a sensing metric above the variable sensing threshold; generating a second occupancy indication based on a location of the detector module; and generating an occupancy decision based on both the first occupancy indication and the second occupancy indication.

Certain embodiments of the invention further include a detector module operable in a cognitive radio device for determining channel occupancy. The detector comprises a sensor for sensing incumbent signals at a variable sensing threshold, wherein the sensor generates a first occupancy indication indicating whether the channel includes an incumbent signal having a sensing metric above the variable sensing threshold; a geo-location unit for generating a second occupancy indication based on a location of the detector module; and a decision unit for generating an occupancy decision based on both the first occupancy indication and the second occupancy indication.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
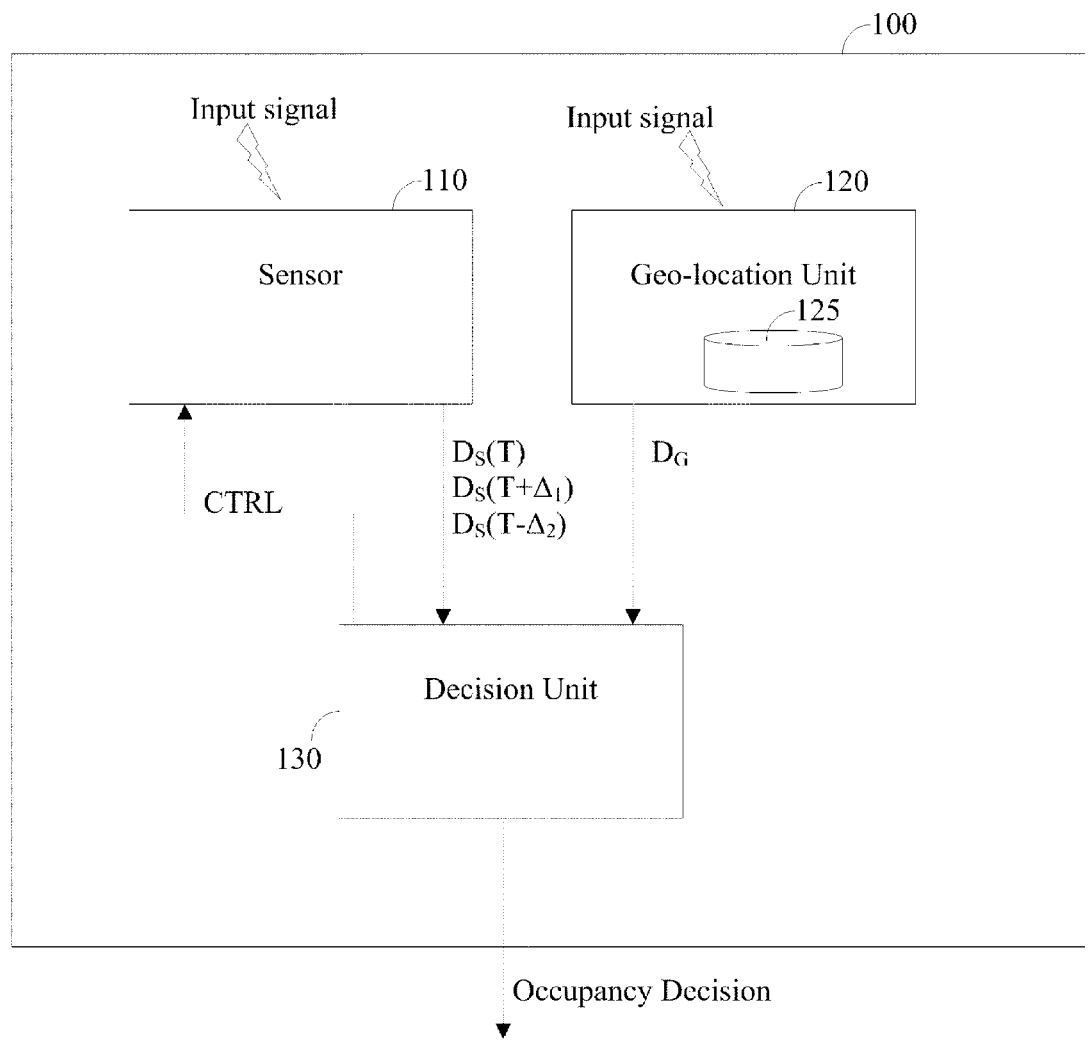
FIG. 1 is a block diagram of a cognitive device constructed in accordance with an embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a non-limiting and exemplary block diagram of a channel availability detector module 100 of a cognitive radio device constructed in accordance with an embodiment of the invention. The detector module 100 includes a sensor 110 for sensing incumbent signals at a variable threshold and a geo-location unit 120 that determines, based on the location of the detector module 100, if the cognitive radio device is inside or outside the coverage of a TV channel. The geo-location unit 120 is operable to access a database 125 that maintains a list of TV channels in the area of the cognitive radio device.

The detector module 100 further comprises a decision unit 130 that determines if a channel is occupied based on the occupancy indications $D_S(T)$ and $D_G$ generated by the sensor 110 and geo-location unit 120, respectively. In an exemplary embodiment, when $D_G$ equals to a logic value '1' the detector module 100 is inside the contour of a TV channel and the channel is occupied. When $D_G$ equals to a logic value '0' the detector module 100 is outside the contour and the channel is vacant. Similarly, $D_S(T)$ equals to a logic value '1' when the sensed signal level is greater than a variable sensor threshold (T), and hence the channel is occupied. If $D_S(T)$ equals to a logic value '0', the signal level is below the variable sensor threshold T and the channel is vacant. The variable sensor threshold is initially set according to the signals to be detected. For example, to detect ATSC signals, the threshold is set to a value of −114 dBm. The indicated logic values of '1' and '0' are only examples used for ease of understanding. One of ordinary skill in the art recognizes that the value may be designed to be any value based on design expediency.

The decision unit 130 determines, based on the values of $D_S(T)$ and $D_G$, whether the channel is vacant or occupied. Specifically, when $D_S(T)=0$ and $D_G=0$ the output occupancy decision is that the channel is vacant; when $D_S(T)=1$ and $D_G=1$ the channel is occupied. When the values of $D_S(T)$ and $D_G$ are different, there is no clear decision with regard to the channel occupancy. In such cases the decision unit 130 generates a control signal (CTRL) to change the variable sensor threshold to which the sensor 110 is set. Specifically, when $D_S(T)=1$ and $D_G=0$, the variable threshold is increased by a value $\Delta_1$ and it is determined that the channel is occupied if $D_S(T+\Delta_1)=1$; otherwise, the channel is vacant. Similarly, when $D_S(T)=0$ and $D_G=1$ the variable threshold for the sensor 110 is reduced by a value $\Delta_2$ and it is determined that the channel is occupied if $D_S(T-\Delta_2)=1$; otherwise, the channel is vacant. In an exemplary embodiment of the invention the values of $\Delta_1$ and $\Delta_2$ may be determined based on the reliability of the terrain and sensing information. For example, if the terrain is flat, the database information is considered to be reliable, thus the occupancy decision will be mostly based on the occupancy indication rather than the sensing indication. Flat terrain includes terrain which includes few obstructions to the signal propagation.

It should be noted that the detector module 100 described herein can be adapted to detect occupancy of the channel by using one of the sensor 110 or the geo-location unit 120, or combination thereof only by properly setting the values of $\Delta_2$ and $\Delta_1$. Specifically, when setting $\Delta_1$ and $\Delta_2$ to 0, the occupancy decision is based only on the sensor 110; if $\Delta_1$ and $\Delta_2$ equal to an infinity number, i.e., a value that is bigger by at least one order of magnitude from the initial level of the sensor threshold T, the occupancy decision is based solely on the geo-location unit 120; when $\Delta_2$ equals to an infinity number the decision relies on detection of signals inside the contour, and sensing with a sensor threshold equals to $T+\Delta_1$ outside the contour of the TV channel; when $\Delta_1$ equals to an infinity number, the decision relies on detection of signals outside the contour, and sensing with a sensor threshold equals to $T-\Delta_2$ inside the contour of the TV channel.

As a non-limiting example if T=−114 dBm, $\Delta_1$=2 dBm and $\Delta_2$=2 dBm, the sensor will sense signals with energy level of −116 dBm inside the contour and −112 dBm outside the contour to determine channel availability. It should be appreciated that devices within the contour are afforded extra protection compared to those outside, while still allowing white space frequencies to be used where available.

Figure 2:
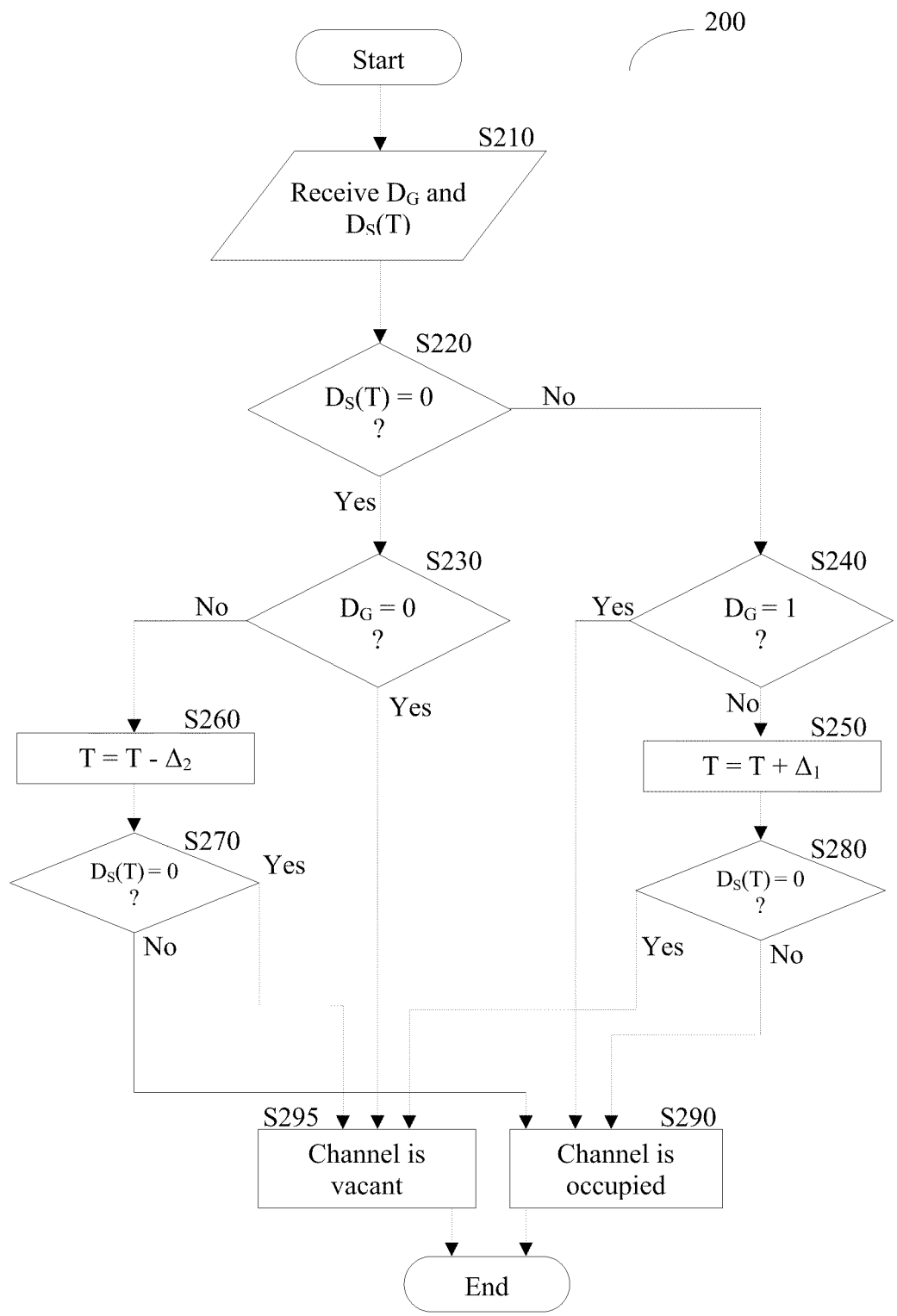
FIG. 2 is a flowchart illustrating a method for determining channel occupancy using a cognitive device implemented in accordance with an embodiment of the invention.

FIG. 2 shows a non-limiting and exemplary flowchart 200 describing the method for determining channel occupancy in white space frequencies implemented in accordance with an embodiment of the invention. At S210 occupancy indications $D_G$ and $D_S(T)$ based on channel sensing and geo-location information are received. In accordance with an exemplary embodiment of the invention the values of the occupancy indications $D_G$ and $D_S(T)$ are either '0' or '1'. At S220 it is determined if $D_S(T)$ equals '0', i.e., if the signal is below a variable sensor threshold (T), and if so execution continues with S230 where it is checked if $D_G$ equals 0; otherwise, execution continues with S240 where it is checked if $D_G$ equals 1.

If step S230 results with an affirmative answer ($D_G$=0), i.e., the cognitive device is outside the contour of the TV channel, and thus, at S295, it is determined that the channel is vacant (as also the signal is below the sensing threshold). If step S230 results with a negative answer ($D_G$=1), i.e., the cognitive device is inside the contour of the TV channel, execution proceeds to S260, where the value of the variable sensor threshold T is decreased by a value $\Delta_2$. Thereafter, at S270, it is determined if the sensing metric (e.g., an energy level) of a signal (if any) in the channel is below the new threshold value $T-\Delta_2$, i.e., $D_S(T-\Delta_2)=0$. If S270 results in an affirmative answer the channel is vacant (S295); otherwise, the channel is occupied (S290).

The execution reaches S240 where it is checked if a signal is in the contour of the TV channel, when the energy level of a signal is above the value of the sensor threshold. If step S240 results with an affirmative answer ($D_G$=1), i.e., the cognitive device is inside the contour of the TV channel, at S290 it is determined that the channel is occupied. If step S240 results with a negative answer ($D_G$=0), i.e., the cognitive device is outside the contour of the TV channel, execution proceeds to S250, where the value of the variable threshold is increased by a value $\Delta_1$. Thereafter, at S280, it is determined if the sensing metric of a signal (if any) in the channel is below the new threshold value, T+i.e., $D_S(T+\Delta_1)=0$. If S280 results in an affirmative answer, the channel is vacant (S295); otherwise, the channel is occupied (S290). It should be noted that steps S220, S230 and S240 may be performed in parallel.

The present invention has been described with a reference to a specific embodiment where the sensor threshold is changed in order to make a determinist decision with regard to an existence of a signal in the channel. Other embodiments would be apparent to one with ordinary skills in the art. For example, instead of modifying the sensor threshold (S250 and S260), the duration of the sensing time can be modified to make a clear decision with regard to the channel occupancy.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A detector module operable in a cognitive radio device for determining channel occupancy, comprising:
   a sensor for sensing incumbent signals at a variable sensing threshold, wherein the sensor generates a first occupancy indication having at least a first state and a second state, wherein the first state of the first occupancy indication indicates that a particular channel includes an incumbent signal having a sensing metric above the variable sensing threshold and the second state of the first occupancy indication indicates that the particular channel does not include the incumbent signal having the sensing metric above the variable sensing threshold;

a geo-location unit for generating a second occupancy indication having at least a first state and a second state, said second occupancy indication being based on a location of the detector module with respect to a contour of the particular channel, wherein the first state of the second occupancy indication indicates that the detector module is located inside the contour of the particular channel and the second state of the second occupancy indication indicates that the detector module is located outside the contour of the particular channel; and a decision unit for generating an occupancy decision based on the first occupancy indication and the second occupancy indication, wherein the decision unit is further configured to adaptively change the variable sensing threshold when the first occupancy indication is in its first state and the second occupancy indication is in its second state or when the first occupancy indication is in its second state and the second occupancy indication is in its first state, wherein the occupancy decision is not deterministic under either condition herein for the first and second occupancy indications.

2. The detection module of claim 1, wherein the second occupancy indication indicates that the channel is occupied when the cognitive radio device is inside the coverage of the channel and further indicates that the channel is vacant if the cognitive radio device is outside the coverage of the channel.

3. The detection module of claim 2, wherein the channel is occupied when both the first occupancy indication and the second occupancy indication indicate that the channel is occupied.

4. The detection module of claim 3, wherein the channel is vacant when the first occupancy indication and the second occupancy indication indicate that the channel is vacant.

5. The detection module of claim 4, wherein the change of the variable sensing threshold further includes:

increasing the variable sensing threshold by a first delta value when the first occupancy indication indicates that the channel is occupied and the second occupancy indication indicates that the channel is vacant;

sensing the channel to generate a new first occupancy indication indicating that the channel is occupied when an incumbent signal having a sensing metric above the new value of the variable sensing threshold is detected;

determining that the channel is occupied when the new first occupancy indication indicates that the channel is occupied; and determining that the channel is vacant when the new first occupancy indication indicates that the channel is vacant.

6. The detection module of claim 4, wherein the change of the variable sensing threshold further includes:

decreasing the variable sensing threshold by a second delta value when the first occupancy indication indicates that the channel is vacant and the second occupancy indication indicates that the channel is occupied;

sensing the channel to generate a new first occupancy indication indicating that the channel is occupied when a signal having a sensing metric above the new value of the variable sensing threshold is detected;

determining that the channel is occupied when the new first occupancy indication indicates that the channel is occupied; and determining that the channel is vacant when the new first occupancy indication indicates that the channel is vacant.

7. The detection module of claim 6, wherein the first delta value and the second delta value are configurable.

8. The detection module of claim 7, wherein the first delta value and the second delta values can be configured to enable detection of channel occupancy based on the sensor or the geo-location unit.

9. A method for determining channel occupancy by a cognitive radio device, comprising:

sensing incumbent signals at a variable sensing threshold, wherein the sensor generates a first occupancy indication having at least a first state and a second state, wherein the first state of the first occupancy indication indicates that a particular channel includes an incumbent signal having a sensing metric above the variable sensing threshold and the second state of the first occupancy indication indicates that the particular channel does not include the incumbent signal having the sensing metric above the variable sensing threshold;

generating a second occupancy indication having at least a first state and a second state, said second occupancy indication being based on a location of the detector module with respect to a contour of the particular channel, wherein the first state of the second occupancy indication indicates that the detector module is located inside the contour of the particular channel and the second state of the second occupancy indication indicates that the detector module is located outside the contour of the particular channel;

generating an occupancy decision based on both the first occupancy indication and the second occupancy indication; and adaptively changing the variable sensing threshold when the first occupancy indication is in its first state and the second occupancy indication is in its second state or when the first occupancy indication is in its second state and the second occupancy indication is in its first state, wherein the occupancy decision is not deterministic under either condition herein for the first and second occupancy indications.

10. The method of claim 9, wherein the second occupancy indication indicates that the channel is occupied when the cognitive radio device is inside the coverage of a channel and further indicates that the channel is vacant if the cognitive radio device is outside the coverage of a channel, wherein the channel is at least a TV channel.

11. The method of claim 9, wherein generating the occupancy decision further comprises determining that the channel is occupied when the first occupancy indication and the second occupancy indication indicate that the channel is occupied.

12. The method of claim 11, further comprising determining that the channel is vacant when both the first occupancy indication and the second occupancy indication indicate that the channel is vacant.

13. The method of claim 12, wherein adaptively changing the variable sensing threshold further comprising:

increasing the variable sensing threshold by a first delta value when the first occupancy indication indicates that the channel is occupied and the second occupancy indication indicates that the channel is vacant;

sensing the channel to generate a new first occupancy indication indicating that the channel is occupied when an incumbent signal having a sensing metric above the new value of the variable sensing threshold is detected;

determining that the channel is occupied when the new first occupancy indication indicates that the channel is occupied; and determining that the channel is vacant when the new first occupancy indication indicates that the channel is vacant.

14. The method of claim 12, wherein adaptively changing the variable sensing threshold further comprising:
decreasing the variable sensing threshold by a second delta value when the first occupancy indication indicates that the channel is vacant and the second occupancy indication indicates that the channel is occupied;
sensing the channel to generate a new first occupancy indication indicating that the channel is occupied when a signal having a sensing metric above the new value of the variable sensing threshold is detected;
determining that the channel is occupied when the new first occupancy indication indicates that the channel is occupied; and
determining that the channel is vacant when the new first occupancy indication indicates that the channel is vacant.

15. The method of claim 14, wherein the first delta value and the second delta value are configurable.

* * * * *